United States Patent Office 2,911,069
Patented Nov. 3, 1959

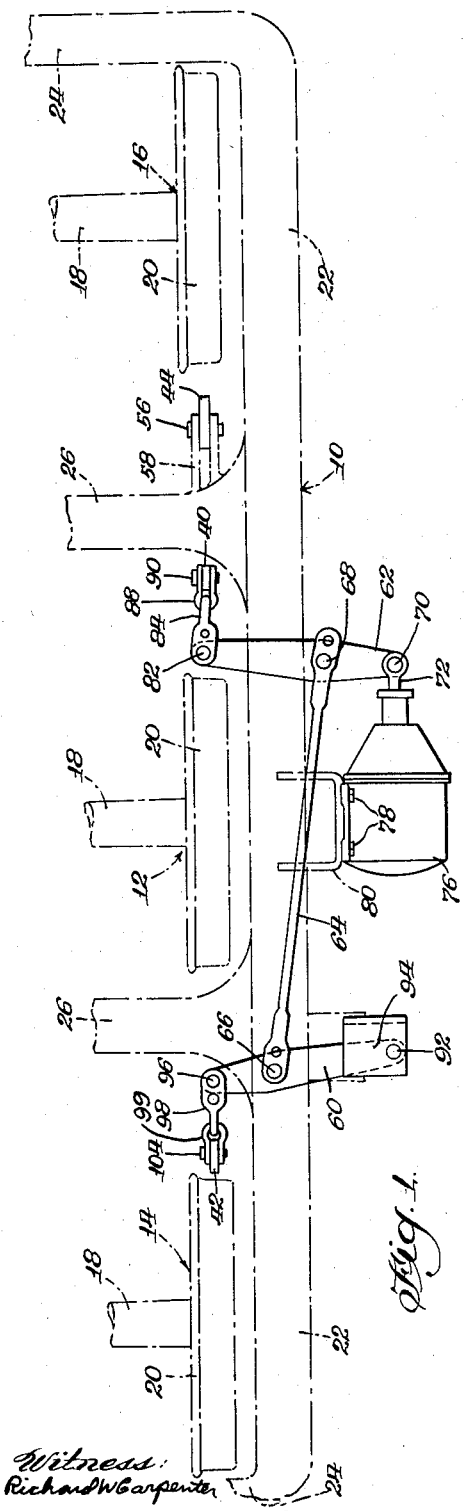

2,911,069

SINGLE SHOE BRAKE ARRANGEMENT FOR SIX WHEEL TRUCKS

Matthew S. Andrzejewski and Walter R. Polanin, Chicago, Ill., assignors to American Steel Foundries, Chicago, Ill., a corporation of New Jersey Application May 29, 1957, Serial No. 662,384

1 Claim. (Cl. 188—46)

This invention relates to railway brakes and more particularly to a linkage system for a single shoe tread brake arrangement.

The invention comprehends a linkage system connecting a frame mounted power cylinder to brake means engageable with the three wheel and axle assemblies of a six-wheel railway car truck of the type especially adapted for use with self-propelled vehicles such as locomotives and motor cars.

An important object of the invention is to provide, in a single shoe brake arrangement for a six-wheel railway car truck, a compact and efficient brake linkage system that is relatively simple in design and construction and economical from the standpoint of production and maintenance.

Another object of the invention is to provide, in a single shoe brake arrangement for a six-wheel railway car truck, a leverage linkage system connecting the power means to brake means engageable with the respective assemblies wherein the linkage elements are all disposed adjacent the sides of the truck and wherein none are disposed within the central portion of the truck.

A more specific object of the invention is to provide, in a single shoe brake arrangement for a six-wheel railway car truck, a linkage system including a pair of dead brake levers connected to the brake means associated with the respective end assemblies, a live brake lever connected to the brake means associated with the center assembly, a compression rod interconnecting one dead brake lever and the live lever, dead operating lever connected to the other dead brake lever, and a live operating lever connected to the live brake lever, to the power means, and to the dead operating lever.

These and other objects of the invention will be apparent from an examination of the following description and drawings, wherein:

Figure 1 is a fragmentary top plan view of a portion of a railway car truck to which has been applied a brake arrangement embodying features of my invention, and Figure 2 is a side elevational view of the structure illustrated in Figure 1.

It will be understood that certain elements have been intentionally omitted from certain view where they are believed to be illustrated to better advantage in other views.

Referring now to the drawings, and particularly to Figures 1 and 2, it will be seen that the novel brake arrangement is shown as applied to a railway car truck comprising a frame indicated generally at 10 which is supported on a center and left and right hand end wheel and axle assemblies 12, 14, and 16, respectively. Each wheel and axle assembly comprises an axle 18 having thereon a pair of wheels 20, only one of which is shown.

The frame is shown as comprising a pair of longitudinally extending spaced side rails 22 (only one of which is shown) which journally receive and are mounted on the respective axles 18 in a conventional manner (not shown). The side rails are interconnected at their ends by a pair of transversely spaced end rails 24 and intermediate their ends by a pair of transversely extending transoms 26 disposed on opposite sides of the center wheel and axle assembly 12.

Deceleration of the truck is achieved by a plurality of brake shoe assemblies disposed adjacent and engageable with the wheels of the respective wheel and axle assemblies, the brake shoe assembly disposed adjacent the wheel of the center wheel and axle assembly being designated 28 and the brake shoe assemblies disposed adjacent the wheels of the left and right hand wheel and axle assemblies 14 and 16 being designated 30 and 32, respectively. As best seen in Figure 2, brake shoe assemblies 28 and 32 are disposed adjacent each other intermediate the wheels of wheel and axle assemblies 12 and 16, whereas brake shoe assembly 30 is disposed inwardly adjacent the wheel of wheel and axle assembly 14. Pivotally connected to the brake shoe assemblies 28, 30 and 32 by pins 34, 36, and 38, respectively, are generally vertically extending brake levers 40, 42, and 44. The brake shoe assembly 30 is pivoted to the lower extremity of brake lever 42, whereas brake shoe assemblies 28 and 32 are pivoted to brake levers 40 and 44 intermediate the ends of the respective levers. The lower extremities of brake levers 40 and 44 are interconnected by a compression rod 46 pivotally connected at its opposite ends by pins 48 and 50 to the lower extremities of the respective levers.

As best seen in Figure 2, outer brake levers 42 and 44 are dead levers. Lever 42 is fulcrumed intermediate its ends by pin 52 to a bracket 54, which is secured to left hand transom 26, whereas lever 44 is fulcrumed at its upper extremity by pin 56 to a bracket 58 secured to right hand transom 26.

Referring now to Figure 1 of the drawings, it will be seen that actuation of the brake levers is effected by a pair of generally horizontally extending dead and live operating levers 60 and 62, respectively, which are in turn connected to each other by a tension rod 64 having its opposite ends pivotally connected by pins 66 and 68 to intermediate portions of the respective operating levers.

The right hand live operating lever 62 is a cylinder lever having its outboard end pivotally connected by pin 70 to a piston rod 72 of a power cylinder 76 which may be secured by nut and bolt assemblies 78 to a mounting bracket 80 rigidly secured to or formed integrally with side rail 22. The power cylinder is preferably disposed outboardly of side rail 22 in axial alignment with center wheel and axle assembly 12. The inboard end of cylinder lever 62 is preferably pivotally connected by pin 82 to links 84 and 88 which in turn are pivotally connected by pin 90 to the upper end of the live center brake lever 40. The outboard end of dead operating lever or actuating lever 60 may be fulcrumed by pin 92 to a bracket 94 secured to the side rail 22. The inboard end of actuating lever 60 is preferably pivotally connected by pin 96 to links 98 and 99 which are pivotally connected by a pin 104 to the left hand dead brake lever 42.

Additional support for left hand brake shoe assembly 30 may be afforded by a hanger 106 pivotally connected at its upper and lower ends by common pivots 52 and 36 to mounting bracket 54 and brake shoe assembly 30, respectively. Center brake shoe assembly 28 may also be additionally supported by means of a hanger 108 pivotally connected at its upper end by pin 109 to the side frame and pivotally connected at its lower end by common pivot 34 to brake shoe assembly 28.

To describe the operation of the device, referring first to Figure 1, it will be understood that, as the power cylinder urges the outboard end of cylinder lever 62 to the right, the lever rotates counterclockwise about pivot 82 thereby pulling tension rod 64 to the right and causing actuating lever 60 to rotate clockwise about pivot 92. Rotation of actuating lever 60 moves the upper end of brake lever 42 to the right, as best seen in Figure 2, causing the lever to rotate clockwise about pivot 52 and move related brake shoe assembly 30 into engagement with the left hand wheel. When the wheel is engaged, the pivot of cylinder lever 62 shifts from pin 82 to pin 68 and the lever continues to rotate counterclockwise urging the upper end of live brake lever 40 to the left, as seen in Figure 2, and causing lever 40 to rotate counterclockwise about pivot 48 and carry its related brake shoe assembly 28 into engagement with the center wheel. When this happens, brake lever 40 continues to rotate counterclockwise about pivot 34 moving compression rod 46 to the right and urging right hand brake lever 44 to rotate counterclockwise about pin 56 and carry its related brake shoe assembly 32 into engagement with the right hand wheel.

Thus, it will be seen that we have provided a compact but efficient brake rigging of relatively simple design and construction which may be readily adapted for use on various types of six-wheel railway car trucks without requiring any substantial change or modification. The arrangement is particularly suited for use on trucks or vehicles of the self-propelled type such as locomotives and motor cars wherein the motors used to propel the vehicles are mounted on the truck frames between the side rails in such a manner as to preclude the use of any linkage having transversely extending beams or other elements disposed between the side rails of the truck.

We claim:

In a tread brake arrangement for a six-wheel railway vehicle truck having a frame supported on a center and two end wheel and axle assemblies, the combination of: friction means disposed for engagement with respective assemblies, the friction means associated with the end assemblies being disposed inwardly of said assemblies; generally vertically extending brake levers pivotally connected to respective friction means, the brake levers connected to the friction means associated with the end assemblies being dead levers fulcrumed to the frame, the lever connected to the friction means associated with the center assembly being a liver lever; a compression rod interconnecting the live brake lever and one of the dead brake levers; a power cylinder mounted on the frame outboardly of and in axial alignment with the center assembly; a pair of generally horizontally extending operating levers disposed on opposite sides of the center assembly between the center assembly and the respective end assemblies, one of said operating levers being a dead lever having one end connected to the other dead brake lever and having the other end fulcrumed to the frame, the other operating lever being a live lever having one end connected to the live brake lever and having the other end connected to the power cylinder; and a tension rod interconnecting medial portions of the operating levers.

References Cited in the file of this patent

UNITED STATES PATENTS

| | | |
|---|---|---|
| 2,471,313 | Crossman | May 24, 1949 |
| 2,716,468 | Simanek | Aug. 30, 1955 |
| 2,754,935 | Tack et al. | July 17, 1956 |